(12) United States Patent
Chen et al.

(10) Patent No.: US 7,379,507 B2
(45) Date of Patent: May 27, 2008

(54) METHOD AND DEVICE FOR MODULATION RECOGNITION OF DIGITALLY MODULATED SIGNALS WITH MULTI-LEVEL MAGNITUDES

(75) Inventors: Ching-Yung Chen, Hsinchu (TW); Chih-Chun Feng, Beigang Township, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 657 days.

(21) Appl. No.: 10/956,603

(22) Filed: Oct. 1, 2004

(65) Prior Publication Data

US 2006/0072679 A1  Apr. 6, 2006

(51) Int. Cl.
*H04B 7/02* (2006.01)

(52) U.S. Cl. .................. 375/267; 375/261; 382/159; 382/165; 382/170; 382/181; 700/48; 701/59; 704/202; 704/232; 706/2; 706/6; 706/15

(58) Field of Classification Search .................. None
See application file for complete search history.

(56) References Cited

U.S. PATENT DOCUMENTS

| | | | | |
|---|---|---|---|---|
| 4,882,738 A | * | 11/1989 | Suzuki .................. | 375/357 |
| 5,212,741 A | * | 5/1993 | Barski et al. ............. | 382/156 |
| 5,381,450 A | * | 1/1995 | Lane .................... | 375/340 |
| 6,028,475 A | | 2/2000 | Kikuchi .................. | 329/304 |
| 2002/0041639 A1 | | 4/2002 | Krupezevic et al. ........ | 375/324 |

FOREIGN PATENT DOCUMENTS

JP  2001127810  11/2001

OTHER PUBLICATIONS

Taira Shintaro, Automatic Classification of QAM Signals by Neural Networks, IEEE International Conference—vol. 2, pp. 1309-1312, 2001.*
L. Vergara Dominquez, J.M. Paez Borrallo, J. Portillo Garcia and B. Ruiz Mezcua, "A general approach to the automatic classification of radiocommunication signals", Signal Processing 22 (1991) 239-250, Elsevier Science Publishers B.V..

* cited by examiner

*Primary Examiner*—David C. Payne
*Assistant Examiner*—Adolf Dsouza (57) ABSTRACT

A modulation recognition method and device for digitally modulated signals with multi-level magnitudes are provided. The modulation recognition method includes selecting plural quantization sizes used to construct plural statistic histograms related to the magnitude of a sequence of data, setting up an off-line processing to extract plural useful feature patterns for each modulation type of interest, receiving a sequence of samples of a modulated object signal and constructing plural statistic histograms related to the magnitude of these samples, and adopting a hierarchical classification method for modulation recognition. It can be applied to the adaptive-modulation communication system, software defined radio, digital broadcasting systems and military communication systems. It can also be integrated with modulation recognition techniques for other types of modulated signals to function in a universal demodulator. It recognizes digitally modulated signals of multi-level magnitudes with low computational complexity in advancing the efficiency of communication systems.

23 Claims, 7 Drawing Sheets

METHOD AND DEVICE FOR MODULATION RECOGNITION OF DIGITALLY MODULATED SIGNALS WITH MULTI-LEVEL MAGNITUDES

FIELD OF THE INVENTION

The present invention generally relates to modulation recognition in digital communications, and more specifically to a method and device for modulation recognition of digitally modulated signals with multi-level magnitudes.

BACKGROUND OF THE INVENTION

For efficient management of bandwidth and maintenance of service quality, a communication or broadcasting transmitter should be able to adaptively adjust transmission data rate according to channel's conditions. Specifically, different channel conditions may lead to the transmitted signal modulated with different types of modulation techniques or a type of modulation technique with different levels, such as quadrature amplitude modulation (QAM) with different levels. Correspondingly, the receiver must be able to automatically recognize the type of modulation technique or the level of the modulation technique used in the transmitting side so that the demodulation process can demodulate the signal correctly. This associated technique required by the receiver is known as modulation recognition.

There have been numerous research reports and patents on modulation recognition since 1984. Among them, the developed algorithms can be categorized, based on their techniques or theories used, into five basic types: (1) pattern recognition, (2) decision theory, (3) second- and higher-order statistics, (4) neural networks, and (5) ad hoc. On the other hand, the aforementioned techniques can also be categorized, based on the type of the modulated signal that can be recognized, into only on digital modulation, and simultaneously on digital and analog modulations. Note that the types of digitally modulated signals include amplitude shift keying (ASK), phase shift keying (PSK), amplitude-phase shift keying (APSK), frequency shift keying (FSK), and QAM.

Figure 1:
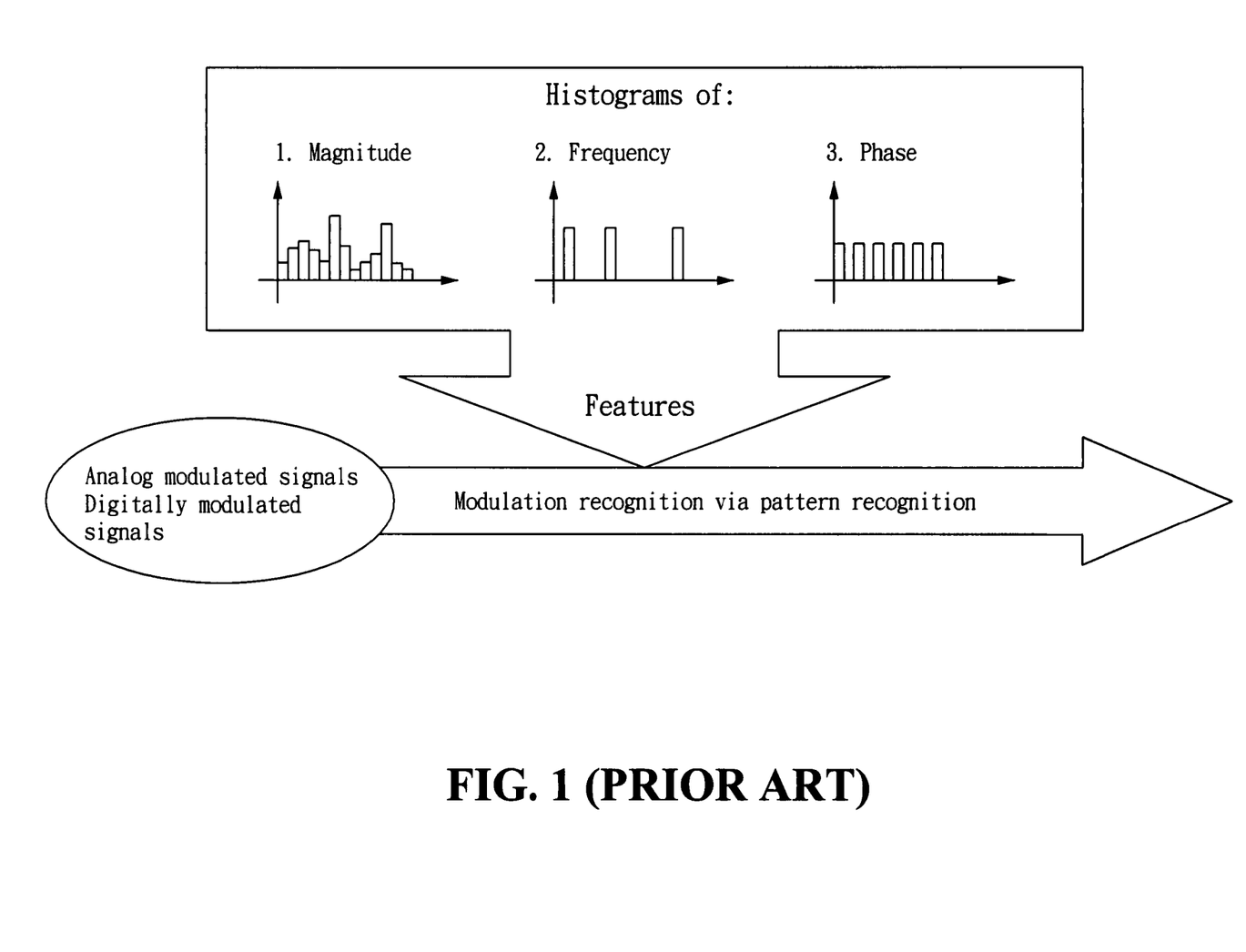
FIG. 1 shows a conventional modulation recognition technique via pattern recognition.

Specifically, Dominguez et al. ("A General Approach to the Automatic Classification of Radio-communication Signals," Signal Processing, vol. 22, no. 3, Mar. 1991) disclosed a universal modulation recognition method by utilizing the histograms of the magnitude, phase and frequency of the received signals followed by a linear pattern recognition procedure, as shown in FIG. 1. This method could recognize almost all types of analog and/or digitally modulated signals. However, its performance is sensitive to phase error for the case of recognition of QAM signals.

QAM is a modulation technique that simultaneously places magnitude and phase of digital data onto a carrier. Because of its high spectrum efficiency, QAM is widely adopted by the standards of high-speed wired and wireless digital communication or broadcasting systems, such as V.29, V.34, DVB-C, DVB-T and ISDB-T, etc. Thereby, the QAM-related technologies, including modulation recognition technique, become the core technologies of designing receivers for communication and broadcasting systems with high-speed transmission and flexible bandwidth management allowed. However, recognition of the QAM signals with different levels (such as 64-QAM and 256-QAM) is far more difficult than that of the digitally modulated signals with different types of modulation techniques, such as those with ASK and PSK, or with PSK and QAM. The difficulty lies in that the modulated signals using different types of modulation techniques have significantly different features, whereas the differences between the features of the QAM signals for different levels are too small to discern easily.

For example, the method developed by Swami and Sadler ("Maximum-likelihood Modulation Classification for PSK/QAM," IEEE Trans. Communications, vol. 48, no. 3, March 2000) uses the higher-order statistics of signals as the features. It can recognize the ASK, PSK, and QAM signals successfully, but fails to recognize the QAM signals of different levels due to the close similarity of the higher-order statistics of the QAM signals for different levels. In addition, with simultaneous utilization of the degrees of freedom of both the magnitude and phase, the QAM signals may appear more complicated compared to the ASK (simply utilizing the degree of freedom of magnitude) and PSK (simply utilizing the degree of freedom of phase) signals. For example, the constellations of higher-level QAMs (256-QAM or 1024-QAM) may have constellations overlapping those for lower-level QAM. This causes the confusion among the QAM signals of different levels and increases the difficulty of modulation recognition.

Another problem often in designing a receiver for a wired or wireless environment is the imperfect frequency (including phase) synchronization problem. The imperfect frequency synchronization comes from either the residual frequency offset or the phase offset for any practical frequency synchronization procedure, or the unpredictable phase noise created by some components, such as crystals and oscillators. Some frequency synchronization algorithms, such as the phase-lock loop (PLL) based carrier recovery algorithm, require the information about the modulation type of the received signals. This means that the modulation recognition must be done before performing the frequency synchronization. On the other hand, the receiver always suffers from some sorts of noise and interference. At the moment, the power ratio of desired signal v.s. noise is defined as signal-to-noise ratio (SNR). The lower the SNR, the more serious effect the noise and interference produce on received signals. Both the effect of imperfect frequency synchronization and the effect of noise and interference on the receiver may cause the failure of modulation recognition. In particular, the imperfect frequency synchronization will make some conventional modulation recognition algorithms assuming perfect frequency synchronization fail to recognize the type of received signals.

To eliminate the impact of the imperfect frequency synchronization, techniques similar to the maximum likelihood methods have been developed either by averaging the phases of received signals or by considering only the magnitude information of received signals. However, these methods are based on the assumption that the noise must be white Gaussian distributed with known variance, i.e., the SNR must be known. Although these algorithms have optimal performance when the assumption is satisfied, these algorithms still have two serious disadvantages. First, when actual signals are different from the assumed signal model, the performance of the algorithm will be significantly degraded. Second, the large amount of computational load becomes a burden on the hardware implementation. In addition, without cooperation between transmitting side and receiving side, the variance of the noise can only be estimated from the received signals at the receiver. When the employed modulation technique is unknown, additional efforts, such as multiple receivers or oversampling techniques, must be paid for the estimation of the noise variance. This essentially limits the design of receivers. Besides, there always exists an error between the estimated variance and the actual variance of the noise.

On the other hand, under the pre-requirements that (i) no additional information about the noise variance is needed, (ii) the performance is free from the imperfect frequency synchronization effect, and (iii) the computational complexity is low, the aforementioned modulation recognition method shown in FIG. 1 can be modified by using only the histograms of the magnitude of the received signals followed by a linear pattern recognition procedure. However, its performance will not meet the requirement of a reliable receiver, especially for the case of low SNR. Because of the wide applications of the QAM in communication and broadcasting systems and because of the aforementioned problems in existing modulation recognition techniques, a modulation recognition method that can recognize digitally modulated signals of multi-level magnitudes with low computational complexity is imperative in advancing the efficiency of communication systems.

SUMMARY OF THE INVENTION

The present invention has been made to overcome the aforementioned drawbacks of the conventional modulation recognition techniques for the signals with multi-level magnitudes, including QAM, APSK and ASK signals. The primary object of the present invention is to provide a method and device for modulation recognition of digital signals with multi-level magnitudes.

The method uses the distribution of the quantized constellation magnitudes as a feature pattern in a hierarchical classification procedure to undergo the pattern recognition and achieve the modulation recognition of received object signals. It can be applied to the adaptive-modulation communication systems, software defined radio (SDR), digital broadcasting systems and military communication systems. It can also be integrated with modulation recognition techniques for other types of modulated signals to function in a universal demodulator.

Thereby, the method for modulation recognition of digitally modulated signals with multi-level magnitudes mainly comprises the following steps: (a) selecting a plurality of quantization sizes used to construct a plurality of statistic histograms related to the magnitude of a sequence of data, (b) setting up an off-line processing to extract a plurality of useful feature patterns as functions of the magnitude related statistic histograms for each modulation type of interest via simulations, (c) receiving a sequence of samples of the modulated object signal whose modulation type is to be recognized and constructing a plurality of statistic histograms related to the magnitude of this sequence of samples, and (d) adopting a classification method based on pattern recognition to recognize the modulation type of the received signal.

According to the invention, the classification method in step (d) uses a hierarchical classification to recognize the modulated signal. The hierarchical classification may determine the optimal number of layers in the hierarchy and the corresponding feature patterns used for each layer according to the considerations on computational complexity and the modulation types to be recognized. In the first embodiment of the invention, the classification is proceeded without checking the confidence in reliability for the modulation recognition. In the second embodiment of the invention, the classification is proceeded together with the use of a threshold decision mechanism to enhance the reliability for the modulation recognition.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

At a digital communication receiving side, the modulated object signal that is obtained by frequency down-conversion, discrete-time sampling and blind channel equalization to the received radio frequency (RF) signal can be modeled as:

$$r[n]=u[n]\cdot e^{j(\Delta\omega n+\Delta\theta+\phi[n])}+w[n] \quad (1)$$

where $u[n]$ represents the modulated real or complex symbol sequence, $w[n]$ represents the real or complex noise that is uncorrelated with $u[n]$ and has a mean $E\{w[n]\}=0$ and variance $E\{|w[n]|^2\}=\sigma_w^2$, and $\Delta\omega$, $\Delta\theta$ and $\phi[n]$ represent the unknown frequency shift, phase shift and phase noise, respectively. The phase noise has a variance $E\{|\phi[n]|^2\}=\sigma_\phi^2$. The SNR of the received object signal $r[n]$ is defined as:

$$SNR = \frac{E\{|u[n]|^2\}}{E\{|w[n]|^2\}} \quad (2)$$

Because the modulated signal of each modulation type corresponds to a different constellation with a unique magnitude distribution, the magnitude distribution of constellation can be used as a feature pattern to recognize the modulation type of the object signal. Because this feature pattern only uses the information about signal magnitude, theoretically, the recognition result based on the feature pattern will not be affected by the effects of the frequency shift $\Delta\omega$, the phase shift $\Delta\theta$ and the phase noise $\phi[n]$. Definitely, a feature pattern for each modulation type of interest can be represented as a vector of finite-length L whose components are composed of the elements of the histogram obtained by quantizing the magnitude of the modulated signals with the modulation types of interest.

Let the magnitude |r[n]| of the received object signal r[n], n=0, 1, ..., N−1, be uniformly quantized by using the same quantization size d to establish the statistic histogram of |r[n]|'s distribution (probability versus quantized magnitudes). The statistic histogram can also be expressed with an object vector having the length L. As the conventional linear pattern recognition technique, comparing the object vector of the statistic histogram with the feature patterns of various modulation types that have been established in advance by off-line processing, the received object signal can be classified as belonging to the modulation type whose feature pattern is the most similar to the object vector. However, when the noise and interference severely distort the received signal, the recognition technique depending on a single feature for each modulation type may cause erroneous recognition and classification. This is especially true for the modulation recognition among certain levels of QAM signals.

Figure 2:
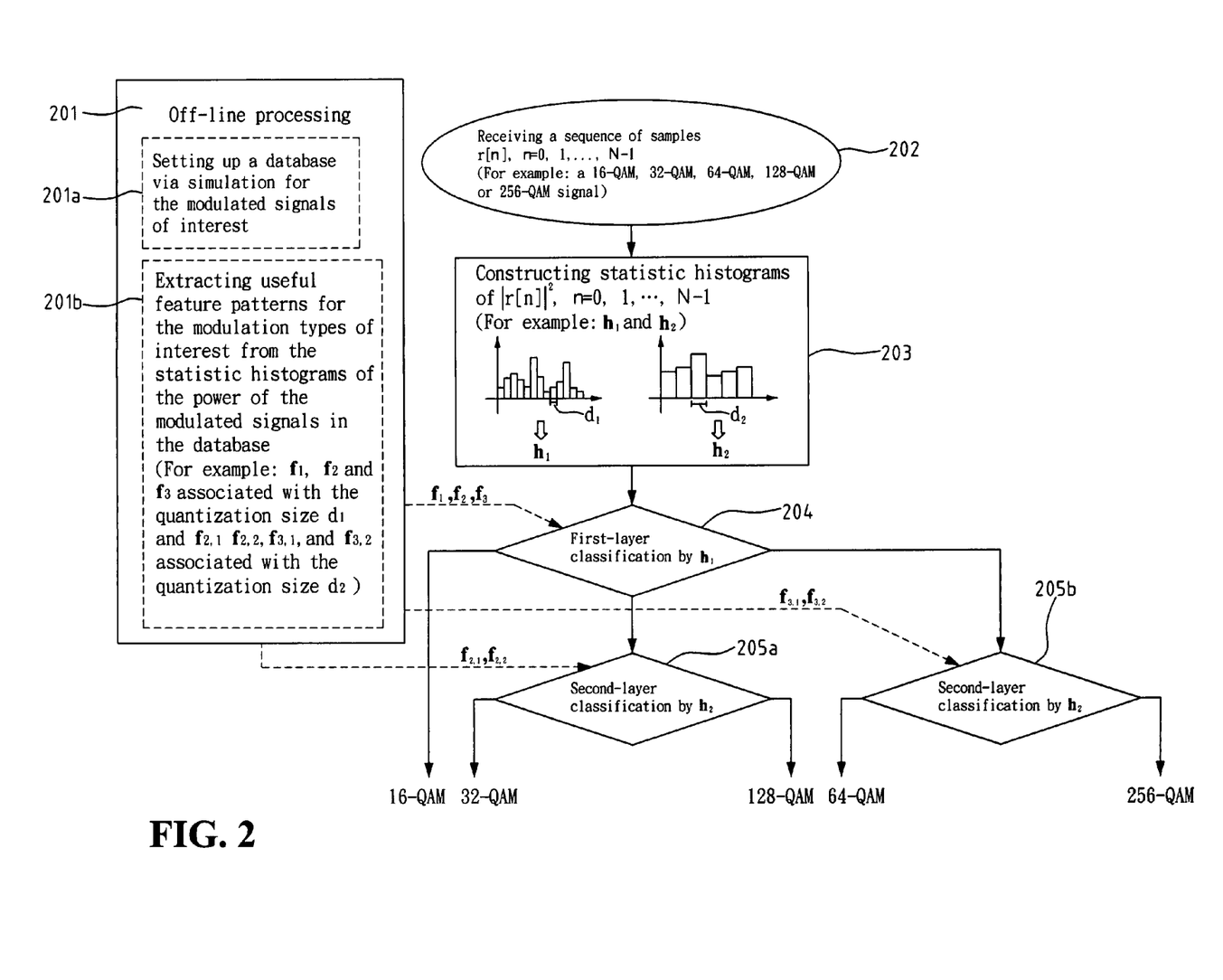
FIG. 2 shows a flowchart of the modulation recognition method for digitally modulated signals with multi-level magnitudes according to the first embodiment of the present invention.

To reduce the probability of erroneous recognition and classification, the present invention uses at least two feature patterns based on the distribution of quantized constellation power levels, and collaborates with a classification method to achieve the modulation recognition. Accordingly, at least one quantization size is selected and at least one statistic histogram for the power level's distribution of the object signal is built. FIG. 2 shows a flowchart for the modulation recognition method according to the first embodiment of the present invention. For easy explanation and without loss of generality, the modulation types of the object signal to be recognized include 16-QAM, 32-QAM, 64-QAM, 128-QAM and 256-QAM as shown in FIG. 2.

In the embodiment of FIG. 2, two quantization sizes, $d_1$ and $d_2$, are used. At the first step 201 in FIG. 2, an off-line processing is set up in order to establish the database of the modulated signals of interest and extract some useful features for each modulation type based on the statistic histograms for the power level's distribution of the modulated signals in the database. This off-line processing 201 is further divided into two steps 201a and 201b, as shown in the FIG. 2. At the step 201a, a database is set up via simulation for the sequences of modulated signals of interest. From the database, some useful feature patterns, for example $f_1$, $f_2$, and $f_3$, are extracted according to the power information recorded on the statistic histograms, as shown in the step 201b. These useful feature patterns are to be adopted by a classification method.

Next, a sequence of samples r[n], n=0, 1, ..., N−1, is received as shown in the step 202. By utilizing the power distribution (the distribution of $|r[n]|^2$) of each sample as the feature of the object signal, two statistic histograms, $h_1$ and $h_2$, are constructed as shown in the step 203. The quantity $|r[n]|^2$ is simply obtained by multiplying r[n] with r*[n], and is quantized by the quantization size $d_i$, i=1, 2. The occurrences of different magnitudes of $|r[n]|^2$ are counted, and then each count is divided by the total sample number N to obtain the probability distribution of $|r[n]|^2$ (i.e. the statistic histogram), which is represented by a vector $h_i$, i=1, 2, to be adopted by a classification method.

For the classification method, there are numerous algorithms that may be employed, such as linear discriminant classification, maximum-likelihood classification, and minimum relative-entropy classification. In our embodiments, linear discriminant classification is employed. According to the invention, the classification method may be used in a hierarchy for the modulation recognition. In the embodiment of FIG. 2, a hierarchical classification of two-layers is illustrated without loss of generality.

In the first-layer classification (also referred to as coarse classification) of the hierarchical classification, the vector $h_1$ is compared to the feature patterns $f_1$, $f_2$ and $f_3$ (also referred to as the layer-1 features) as shown in the step 204. A layer-1 feature represents the characteristic of a group of modulated signals corresponding to at least one type of modulations. The details of extracting $f_1$, $f_2$ and $f_3$ will be defined and described later. The first-layer classification by $h_1$ classifies the received object signal as one of the three possible classes: (i) the "16-QAM" class, (ii) the group of "32-QAM and 128-QAM", and (iii) the group of "64-QAM and 256-QAM". If the classification result is in either the group of "32-QAM and 128-QAM" or the group of "64-QAM and 256-QAM", a further second-layer classification (also referred to as the fine classification) is needed. In the second-layer classification, the vector $h_2$ is compared to the feature patterns $f_{2,1}$ and $f_{2,2}$, (also referred to as the layer-2 features) or to the feature patterns $f_{3,1}$ and $f_{3,2}$ (also referred to as the layer-2 features). A layer-2 feature represents the characteristic of a class of modulated signals corresponding to a modulation type. The details in obtaining $f_{2,1}$, $f_{2,2}$, $f_{3,1}$ and $f_{3,2}$ will be defined and described later.

The reason of executing the second-layer classification is that it is easy to distinguish 16-QAM from other levels of QAM signals when using $d_1$ as the quantization size, while it is prone to incorrectly classify 32-QAM as 128-QAM, and vice versa. The same mistakes may occur between 64-QAM and 256-QAM. Therefore, it is necessary to use a second vector $h_2$ (i.e., the statistic histogram corresponding to the quantization size $d_2$) to further distinguish 32-QAM from 128-QAM, or 64-QAM from 256-QAM. As shown in step 205a of FIG. 2, the vector $h_2$ is compared to the layer-2 features $f_{2,1}$ and $f_{2,2}$ for distinguishing 32-QAM from 128-QAM. While in step 205b, the vector $h_2$ is compared to the layer-2 features $f_{3,1}$ and $f_{3,2}$ for distinguishing 64-QAM from 256-QAM. Based on this design scheme, a system designer may determine the optimal number of layers in the hierarchy and the corresponding feature patterns used for each layer according to the considerations on computational complexity and the modulation types to be recognized. Thereby, the system design can meet the expected needs on system functionalities.

Figure 3:
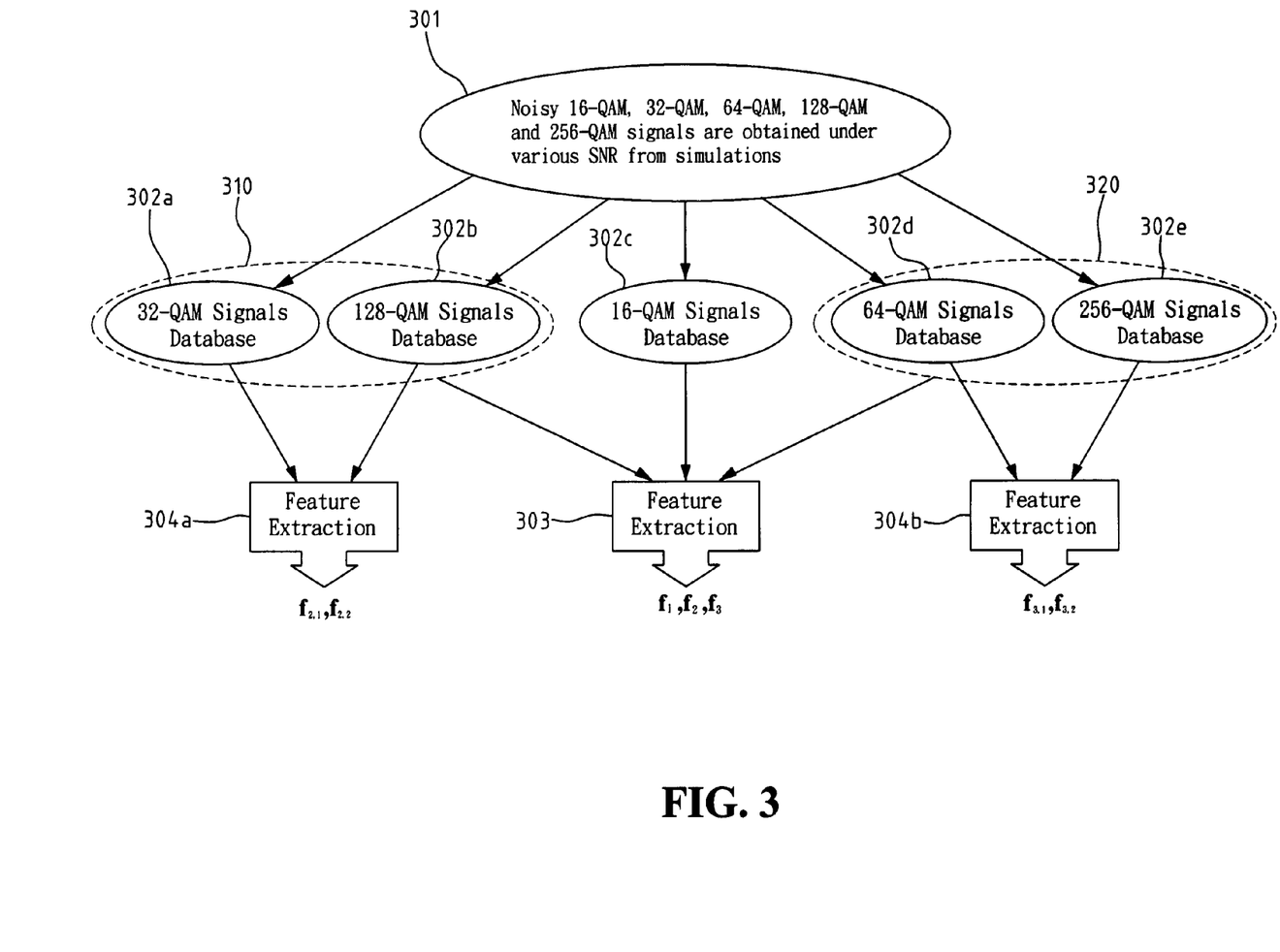
FIG. 3 further illustrates the steps for the off-line processing in FIG. 2.

FIG. 3 further illustrates the off-line processing 201 assuming that the modulation types to be recognized include 16-QAM, 32-QAM, 64QAM, 128-QAM and 256-QAM. The function of the off-line processing can be implemented with a computer. At the first step 301 in FIG. 3, noisy 16-QAM, 32-QAM, 64-QAM, 128-QAM and 256-QAM signals are obtained under various SNR from simulations. First, the SNR range of the signals to be recognized is determined according to the application of interest. Different modulation types may have different SNR ranges. Then, the simulated signals having the length NT are generated in the determined SNR range for different modulated signals interfered by different noises.

At the second step in FIG. 3, an individual database for each type of signal is constructed, as marked by 302a, 302b, 302c, 302d, and 302e in FIG. 3. The power of each simulated signal is further quantized using the quantization size $d_1$ ($d_2$), and represented by a vector $v_i^{(k)}$ ($g_i^{(k)}$) where k denotes the modulation level. If a set of simulated signals are generated every 1 dB spacing of SNR, the databases shown in the following table, Table 1, can be constructed.

TABLE 1

| | SNR Range | Database (quantization size $d_1$) | Database (quantization size $d_2$) |
|---|---|---|---|
| 16-QAM | 12~40 dB | $v_1^{(16)}, v_2^{(16)}, \ldots, v_{29}^{(16)}$ | |
| 32-QAM | 15~40 dB | $v_1^{(32)}, v_2^{(32)}, \ldots, v_{26}^{(32)}$ | $g_1^{(32)}, g_2^{(32)}, \ldots, g_{26}^{(32)}$ |
| 64-QAM | 18~40 dB | $v_1^{(64)}, v_2^{(64)}, \ldots, v_{23}^{(64)}$ | $g_1^{(64)}, g_2^{(64)}, \ldots, g_{23}^{(64)}$ |
| 128-QAM | 21~40 dB | $v_1^{(128)}, v_2^{(128)}, \ldots, v_{20}^{(128)}$ | $g_1^{(128)}, g_2^{(128)}, \ldots, g_{20}^{(128)}$ |
| 256-QAM | 24~40 dB | $v_1^{(256)}, v_2^{(256)}, \ldots, v_{17}^{(256)}$ | $g_1^{(256)}, g_2^{(256)}, \ldots, g_{17}^{(256)}$ |

At the third steps in FIG. 3, useful feature patterns are respectively extracted from databases 302a, 302b, 302c, 302d, and 302e, as marked by 304a, 303, and 304b in FIG. 3. The useful feature patterns include the layer-2 features $f_{2,1}$, $f_{2,2}$, layer-1 features $f_1$, $f_2$, $f_3$ and layer-2 features $f_{3,1}$, $f_{3,2}$, and are respectively calculated by the following equations (3)~(9).

$$f_1 = \left(\frac{1}{3}(m_v^{(16)})^T R_v^{-1}\right)^T \quad (3)$$

$$f_2 = \left(\frac{1}{3}(m_v^{(32,128)})^T R_v^{-1}\right)^T \quad (4)$$

$$f_3 = \left(\frac{1}{3}(m_v^{(64,256)})^T R_v^{-1}\right)^T \text{ where} \quad (5)$$

$$m_v^{(16)} = \frac{1}{29}\sum_{i=1}^{29} v_i^{(16)}, \; m_v^{(32,128)} = \frac{1}{46}\left(\sum_{i=1}^{26} v_i^{(32)} + \sum_{i=1}^{20} v_i^{(128)}\right),$$

$$m_v^{(64,256)} = \frac{1}{40}\left(\sum_{i=1}^{23} v_i^{(64)} + \sum_{i=1}^{17} v_i^{(256)}\right), \text{ and}$$

$$R_v =$$

$$\frac{1}{3}\left\{\frac{1}{29}\left(\sum_{i=1}^{29} v_i^{(16)}(v_i^{(16)})^T\right) + \frac{1}{46}\left(\sum_{i=1}^{26} v_i^{(32)}(v_i^{(32)})^T + \sum_{i=1}^{20} v_i^{(128)}(v_i^{(128)})^T\right) + \right.$$

$$\left. \frac{1}{40}\left(\sum_{i=1}^{23} v_i^{(64)}(v_i^{(64)})^T + \sum_{i=1}^{17} v_i^{(256)}(v_i^{(256)})^T\right)\right\}$$

$$f_{2,1} = \left(\frac{1}{2}(m_g^{(32)})^T R_{g,2}^{-1}\right)^T \quad (6)$$

$$f_{2,2} = \left(\frac{1}{2}(m_g^{(128)})^T R_{g,2}^{-1}\right)^T \quad (7)$$

$$f_{3,1} = \left(\frac{1}{2}(m_g^{(64)})^T R_{g,3}^{-1}\right)^T \quad (8)$$

$$f_{3,2} = \left(\frac{1}{2}(m_g^{(256)})^T R_{g,3}^{-1}\right)^T \text{ where} \quad (9)$$

$$m_g^{(32)} = \frac{1}{26}\sum_{i=1}^{26} g_i^{(32)}, \; m_g^{(128)} = \frac{1}{20}\sum_{i=1}^{20} g_i^{(128)},$$

$$m_g^{(64)} = \frac{1}{23}\sum_{i=1}^{23} g_i^{(64)}, \; m_g^{(256)} = \frac{1}{17}\sum_{i=1}^{17} g_i^{(256)},$$

$$R_{g,2} = \frac{1}{2}\left(\frac{1}{26}\sum_{i=1}^{26} g_i^{(32)}(g_i^{(32)})^T + \frac{1}{20}\sum_{i=1}^{20} g_i^{(128)}(g_i^{(128)})^T\right), \text{ and}$$

$$R_{g,3} = \frac{1}{2}\left(\frac{1}{23}\sum_{i=1}^{23} g_i^{(64)}(g_i^{(64)})^T + \frac{1}{17}\sum_{i=1}^{17} g_i^{(256)}(g_i^{(256)})^T\right).$$

Figure 4:
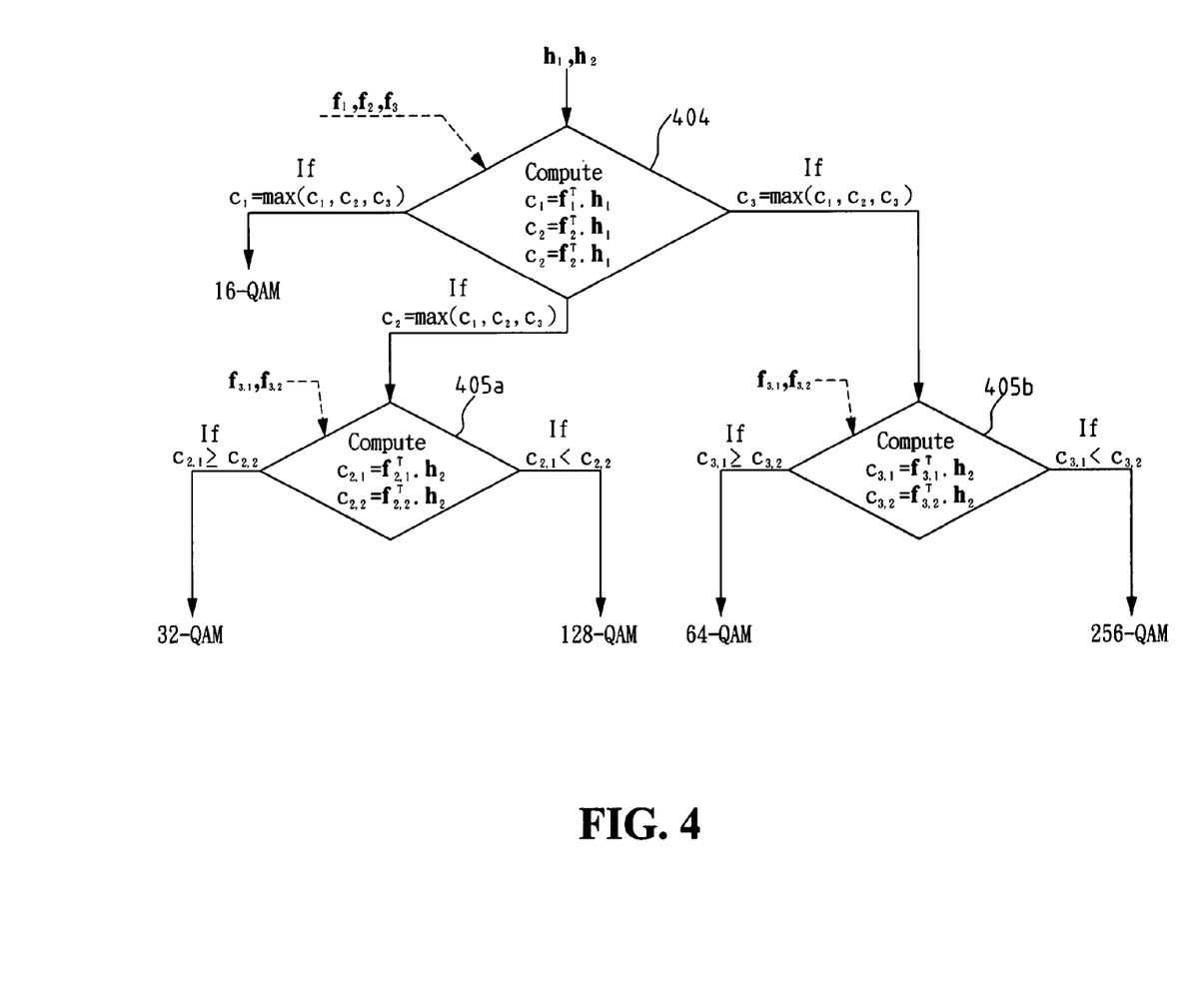
FIG. 4 further illustrates the steps for the hierarchical classification in FIG. 2.

Returning to FIG. 2, step 204 is the first-layer classification and step 205a and step 205b are the second-layer classifications. The classification function of steps 204, 205a, and 205b can be implemented with inner-product calculator, magnitude comparator, and flow-path selector. The flow for performing the classification function is as shown in FIG. 4. Referring to FIG. 4, the inner products $c_1(=f_1^T \cdot h_1)$, $c_2(=f_2^T \cdot h_1)$, $c_3(=f_3^T \cdot h_1)$ are computed and compared at step 404. If $c_1$ is the maximum among the three, the received signal is recognized as belonging to 16-QAM class. If $c_2$ is the maximum among the three, the received signal is recognized as belonging to the group of "32-QAM and 128-QAM", and a further computation and comparison is required, as in step 405a. Similarly, if $c_3$ is the maximum among the three, the received signal is recognized as belonging to the group of "64-QAM and 256-QAM", and a further computation and comparison is required, as in step 405b.

For further distinguishing 32-QAM from 128-QAM in step 405a, $c_{2,1}(=f_{2,1}^T \cdot h_2)$ and $c_{2,2}(=f_{2,2}^T \cdot h_2)$ are computed and compared. If $c_{2,1} \geq c_{2,2}$, the received signal is recognized as belonging to 32-QAM. Otherwise, the received signal is recognized as belonging to 128-QAM. For further distinguishing 64-QAM from 256 QAM in step 405b, $c_{3,1}(=f_{3,1}^T \cdot h_2)$ and $c_{3,2}(=f_{3,2}^T \cdot h_2)$ are computed and compared. If $c_{3,1} \geq c_{3,2}$, the received signal is recognized as belonging to 64-QAM. Otherwise, the received signal is recognized as belonging to 256-QAM.

Figure 5:
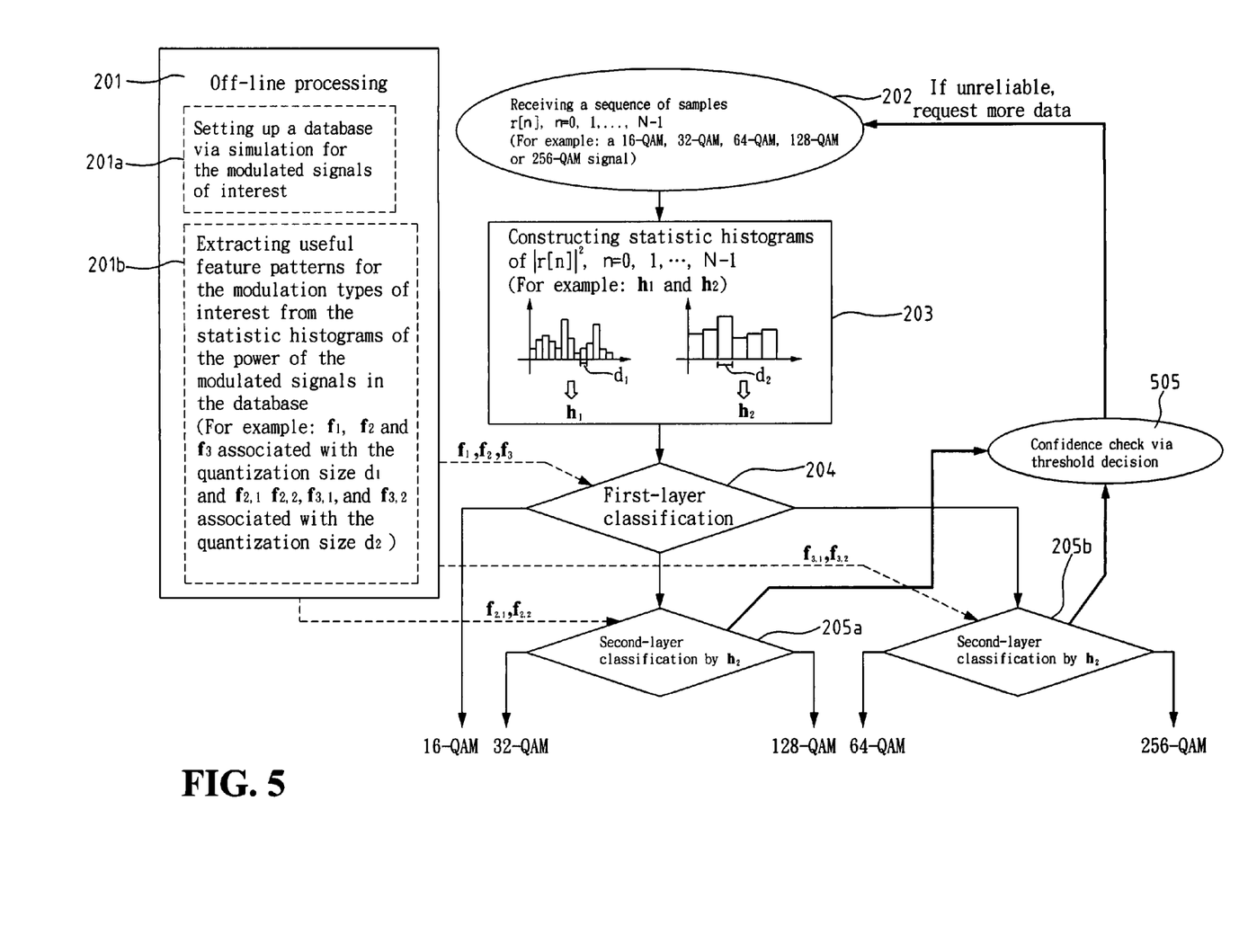
FIG. 5 shows a flowchart of the second embodiment of the present invention, in which the classification is proceeded together with the use of a threshold decision mechanism to check the confidence in reliability for the modulation recognition.

FIG. 5 shows a flowchart for another embodiment of the present invention, in which the upper-layer classification uses a threshold decision to check the confidence in the reliability for the modulation recognition. In the second embodiment of FIG. 5, the second-layer classification further includes a step of confidence check 505 to enhance the reliability for the modulation recognition before deciding the modulation type of the object signal. The second-layer classification uses a predetermined threshold $\lambda$ and checks the confidence via threshold decision. If the difference between two inner product outputs (for example, $c_{2,1}$ and $c_{2,2}$) is less than the predetermined threshold $\lambda$, then more data from the object signal are requested for enhancing the reliability of the modulation recognition, as illustrated in FIG. 5. The predetermined threshold $\lambda$ is dependent on the modulation type to be recognized.

In the invention, the parameters of quantization sizes and the number of required layers in the hierarchy are the main factors that may affect the accuracy of final modulation recognition. Because the modulated signals to be recognized are different in different application environments, this invention provides a feasible rule to help in selecting these parameters as stated below.

In the invention, at least two quantization sizes are first selected. Then, plural feature patterns for each modulation type are generated corresponding to the quantization sizes. For each quantization size, this invention observes the differences among the feature patterns. If the difference between two different feature patterns is too small, then the quantization size is not suitable for recognizing the modulated signals corresponding to these two different feature patterns, which are therefore categorized to a group. Otherwise, the quantization size is used to recognize the modulated signals to which the two different feature patterns correspond. According to the rule, this invention continues to observe the differences among other quantization sizes. Based on the observed results, the preferred quantization sizes and the number of required layers in the hierarchy can be finally determined.

Figure 6:
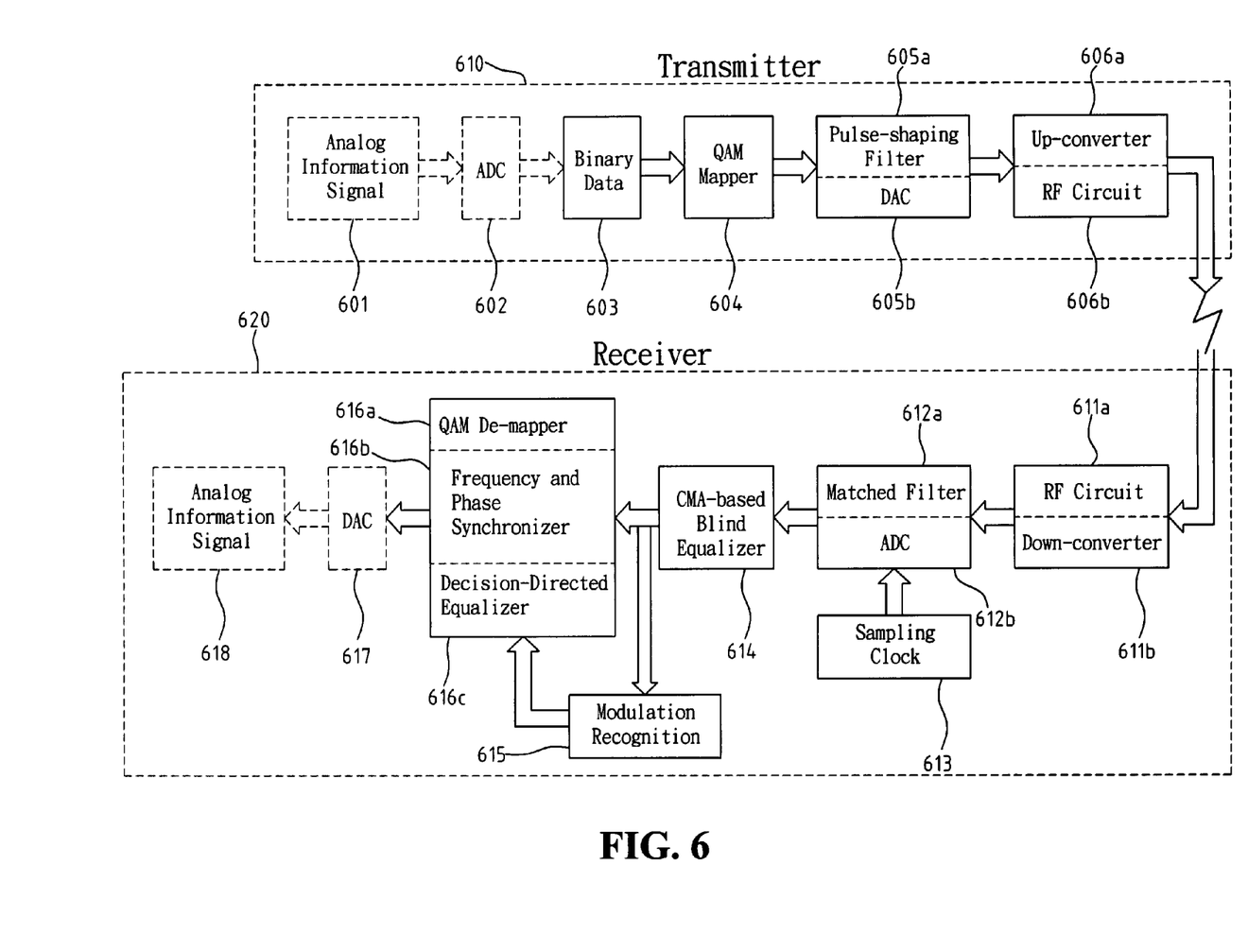
FIG. 6 shows a block diagram of a communication system having a transmitter and a receiver, wherein the modulation recognition of the present invention is applied to the communication system.

FIG. 6 shows a block diagram for a communication system having a transmitter 610 and a receiver 620, wherein the modulation recognition method of the present invention is applied to the communication system. Referring to the transmitter 610 in FIG.6, an analog information signal 601, if presents, is first converted into a binary data 603 by an analog/digital converter (ADC) 602 for transmission. Transmitter 610 then uses a QAM mapper 604 of certain level, for example, 16-QAM, 32-QAM, 64-QAM, 128-QAM, or 256-QAM to modulate the binary data 603, and uses a pulse-shaping filter 605a and a digital/analog converter (DAC) 605b to convert the digitally modulated signal into a baseband analog signal. It further uses an up-converter 606a to translate the baseband signal to an RF signal, and uses an analog RF transmitting circuit 606b, such as antenna or cable plug, to emit the RF signal into an EM-wave transmitting medium, such as air or cable.

Receiver 620 includes an analog RF receiving circuit 611a, a frequency down-converter 611b, an analog matched filter 612a, an ADC 612b, a sampling clock 613, a constant modulus algorithm (CMA)-based blind channel equalizer 614, a QAM de-mapper 616a, a frequency and phase synchronizer 616b, a decision-directed equalizer 616c and a modulation recognition device 615. The analog matched filter 612a may be implemented with a digital filter for processing digitized signals. The sampling clock 613 can adjust the sampling rate to be greater than the transmission symbol rate. The CMA-based blind channel equalizer 614 can be used in a baud-spaced or a fractionally-spaced structure depending on the sampling rate. The frequency and phase synchronizer 616b may implement a carrier recovery algorithm.

The received analog signal is often interfered by the non-ideal channel, such as multipath reflection effects, and the down-converter often has frequency and phase shift caused by mismatch between the local oscillator and the transmitter's oscillator. If there is no sampling clock drift and the CMA-based blind channel equalizer 614 can perfectly compensate for the distortion caused by the non-ideal channel, the output signal of the CMA-based blind channel equalizer 614 can be modeled as equation (1). Based on the CMA, it can be obtained that $E\{|r[n]|^4/|r[n]|^2\}=\gamma$, where $\gamma$ is a parameter in the CMA.

The modulation recognition device 615 according to the present invention can recognize the output signal r[n] of the CMA-based blind channel equalizer 614. One of the preferred implementation method is to choose $N_T=10000$, $d_1=0.2\gamma$ and $d_2=0.488\gamma$ to construct a table as Table 1, where $v_i^{(k)}$ is a vector of length 13 and $g_i^{(k)}$ is a vector of length 6. Based on equations (3)-(9), the feature patterns $f_1$, $f_2$, $f_3$, $f_{2,1}$, $f_{2,2}$, $f_{3,1}$, and $f_{3,2}$ are obtained. After the output signal r[n] of the CMA-based blind channel equalizer 614 successfully recognized the modulation type according to the process flow in FIG. 2, the signal r[n] can be demodulated by the corresponding QAM demodulator to obtain the original data.

Figure 7:
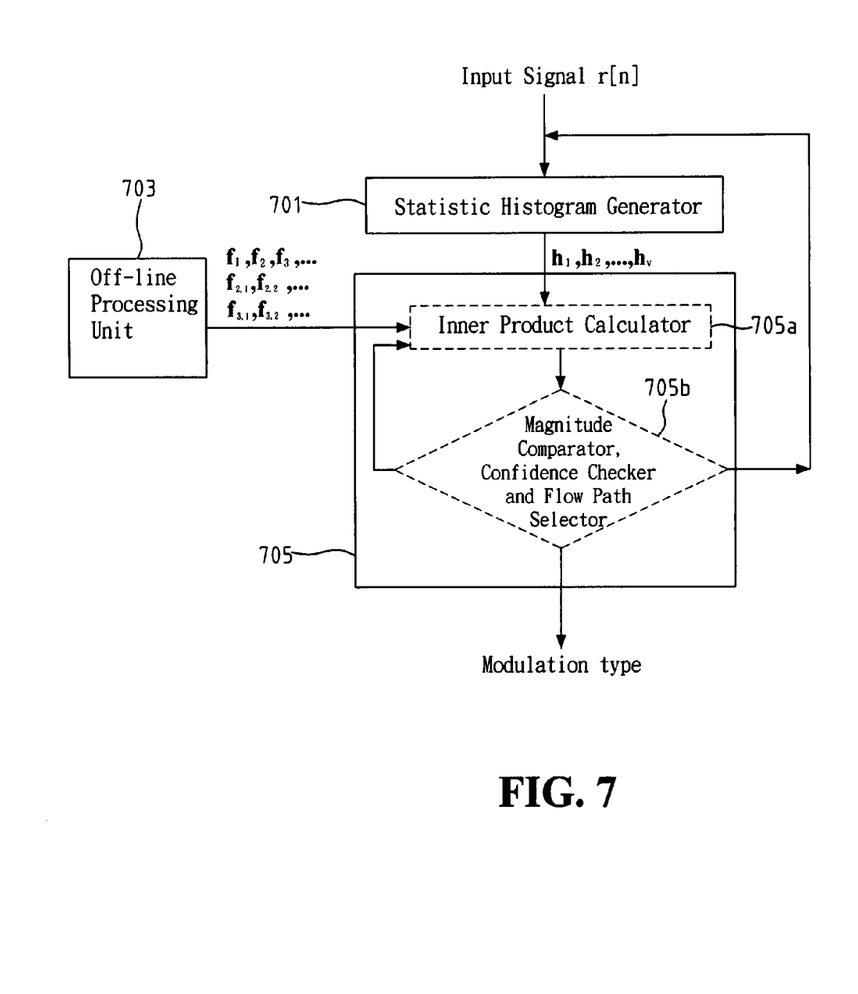
FIG. 7 shows a schematic representation of a modulation recognition device according to the present invention.

FIG. 7 shows a schematic representation of the modulation recognition device 615 according to the present invention. Referring to FIG. 7, the modulation recognition device 615 comprises a statistic histogram generator 701, an off-line processing unit 703, and a classification unit 705. The modulation recognition device 615 receives an input sequence of the samples r[n], n=0, 1, . . . , N−1. The statistic histogram generator 701 quantizes the power of the input sequence and constructs a plurality of statistic histograms of vectors $h_1, h_2, \ldots, h_v$, by utilizing the distribution of $|r[n]|^2$. Note that any form of |r[n]| can also be used to construct the statistic histograms. The off-line processing unit 703 sets up a database via simulation for the modulated signals of interest under various SNR as mentioned earlier, and extracts a plurality of useful feature patterns, such as $f_1$, $f_2$, $f_3$, . . . $f_{2,1}$, $f_{2,2}$, . . . , $f_{3,1}$, $f_{3,2}$, . . . , etc. The classification unit 705 recognizes the modulation type of the received object signal r[n] based on the useful feature patterns and the plurality of statistic histograms $h_1, h_2, \ldots, h_v$.

As mentioned earlier, the function of the off-line processing unit 703 may be implemented with a computer, thereby, the computer may include a data processing unit. The function of the classification unit 705 may also be implemented with an inner product calculator 705a, a magnitude comparator and a flow path selector 705b for the first embodiment of FIG. 2. For the second embodiment of FIG. 5, the classification unit 705 further includes a confidence checker 705b, which can be implemented with a magnitude comparator.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A modulation recognition method for digitally modulated signals with multi-level magnitudes, comprising the steps of:
    (a) selecting a plurality of quantization sizes used to construct a plurality of statistic histograms related to the magnitude of a sequence of data;
    (b) extracting a plurality of useful feature patterns as functions of said plurality of statistic histograms for each modulation type of interest;
    (c) receiving a sequence of samples of a modulated object signal whose modulation type is to be recognized and constructing a plurality of said statistic histograms related to the magnitude of said sequence of samples; and
    (d) utilizing a hierarchical classification method based on pattern recognition to recognize the modulation type of said modulated object signal.

2. The modulation recognition method as claimed in claim 1, wherein the modulation types of interest in the step (b) include 16-QAM, 32-QAM, 64-QAM, 128-QAM and 256-QAM, and QAM is referred to as quadrature amplitude modulation.

3. The modulation recognition method as claimed in claim 1, wherein said step (b) is an off-line processing and further comprises the steps of:
    (b1) setting up a database including generation of noisy modulated signals via simulation for the modulation types of interest; and (b2) extracting said plurality of useful feature patterns for each modulation type based on magnitude related information of said noisy modulated signals in said database.

4. The modulation recognition method as claimed in claim 3, wherein said setting up a database in step (b1) further comprises the steps of:
(b 11) obtaining noisy modulated signals for the said modulation types of interest under various signal-to-noise ratio (SNR) from simulations; and
(b12) constructing an individual database for each of the modulation types of interest by quantizing the power of the noisy modulated signals from simulations using said plurality of quantization sizes and representing the distribution of power levels by a plurality of vectors.

5. The modulation recognition method as claimed in claim 4, wherein said step (b11) further comprises the steps of::
determining an SNR range for said modulation types of interest according to application environments; and
generating the noisy modulated signals in said determined SNR range for different types of modulated signals interfered by different noises.

6. The modulation recognition method as claimed in claim 1, wherein said useful feature patterns in step (b) include multi-layer features for said hierarchical classification method.

7. The modulation recognition method as claimed in claim 6, wherein said multi-layer features used in a certain layer in said hierarchical classification method represent the characteristic of either a class or a group of said digitally modulated signals.

8. The modulation recognition method as claimed in claim 1, wherein each of said statistic histograms in step (c) is represented by a vector and constructed by the following steps:
(c1) obtaining the power of each of said samples of said modulated object signal by multiplying each of said samples with its complex conjugate;
(c2) for each of said selected quantization sizes, quantizing said power of each sample and computing the counts of occurrences of different power levels;
(c3) for each of said selected quantization sizes, dividing said counts by the total number of said samples of said modulated object signal and obtaining the probability distribution of said power levels, and said probability distribution being referred to as a statistic histogram; and
(c4) for each of said selected quantization sizes, representing said statistic histogram by a vector of finite length, and said vector being referred to as an object vector.

9. The modulation recognition method as claimed in claim 8, wherein one of linear discriminant classification, maximum-likelihood classification, and minimum relative-entropy classification is employed for said hierarchical classification method.

10. The modulation recognition method as claimed in claim 9, wherein said hierarchical classification method further includes a step of confidence check via a threshold decision to enhance the reliability for the modulation recognition when said linear discriminant classification is employed.

11. The modulation recognition method as claimed in claim 10, wherein said linear discriminant classification classifies said object vector by comparing the values of the inner products of said object vector and said useful feature patterns, and the difference between the two largest values of said inner products is referred to as discrimination.

12. The modulation recognition method as claimed in claim 11, wherein an upper-layer classification in said hierarchical classification method uses a predetermined threshold to check the confidence in reliability for the modulation recognition, and if said discrimination is less than said predetermined threshold, more samples of said modulated object signal are requested for the modulation recognition.

13. The modulation recognition method as claimed in claim 1, wherein two quantization sizes are selected in step (a), seven useful feature patterns are extracted in step (b), two statistic histograms of the power of said sequence of samples are constructed in step (c), and a two-layer hierarchical classification is adopted in step (d).

14. The modulation recognition method as claimed in claim 13, wherein a first statistic histogram of said two statistic histograms is compared with three layer-1 features of said seven useful feature patterns, and the comparison results classify said modulated object signal as either a 16-QAM class or one of the groups of "32-QAM and 128-QAM" and "64-QAM and 256-QAM".

15. The modulation recognition method as claimed in claim 14 wherein a second statistic histogram of said two statistic histograms is compared with two layer-2 features of said seven useful feature patterns if said modulated object signal is classified to one of the groups of "32-QAM and 128-QAM" and "64-QAM and 256-QAM" in a first layer, and the comparison results further classify said modulated object signal to one of 32-QAM, 128-QAM, 64-QAM, and 256-QAM classes.

16. The modulation recognition method as claimed in claim 15, wherein two layer-2 features of said seven useful feature patterns are used for distinguishing 32-QAM from 128-QAM, and other two layer-2 features of said seven useful feature patterns are used for distinguishing 64-QAM from 256-QAM.

17. The modulation recognition method as claimed in claim 1, wherein said hierarchical classification method is implemented by inner product, magnitude comparison, and flow path selection.

18. A modulation recognition device having an input sequence of samples of a modulated object signal with multi-level magnitudes to be recognized, said modulation recognition device comprising:
an off-line processing unit, setting up a database via simulation for noisy modulated signals whose modulation types are of interest, and extracting a plurality of useful feature patterns for said modulation types of interest from statistic histograms related to magnitude of simulated signals in said database;
a statistic histogram generator, quantizing magnitude related information of said input sequence of samples of the modulated object signal, and constructing a plurality of object vectors representing the statistic histograms obtained by utilizing the magnitude related information of said input sequence of samples of the modulated object signal; and
a hierarchical classification unit, recognizing the modulation type of said modulated object signal based on said useful feature patterns and said plurality of object vectors.

19. The modulation recognition device as claimed in claim 18, wherein said modulated types of interest include 16-QAM, 32-QAM, 64-QAM, 128-QAM and 256-QAM, and QAM is referred to as quadrature amplitude modulation.

20. The modulation recognition device as claimed in claim 18, wherein said off-line processing unit is implemented with a computer having a data processing unit.

21. The modulation recognition device as claimed in claim 18, wherein said classification unit further comprises an inner product calculator, a magnitude comparator, and a flow path selector.

22. The modulation recognition device as claimed in claim 21, wherein said classification unit further includes a confidence checker to enhance the reliability for said modulation recognition device.

23. The modulation recognition device as claimed in claim 22, wherein said confidence checker is implemented with a magnitude comparator.

* * * * *